UNITED STATES PATENT OFFICE.

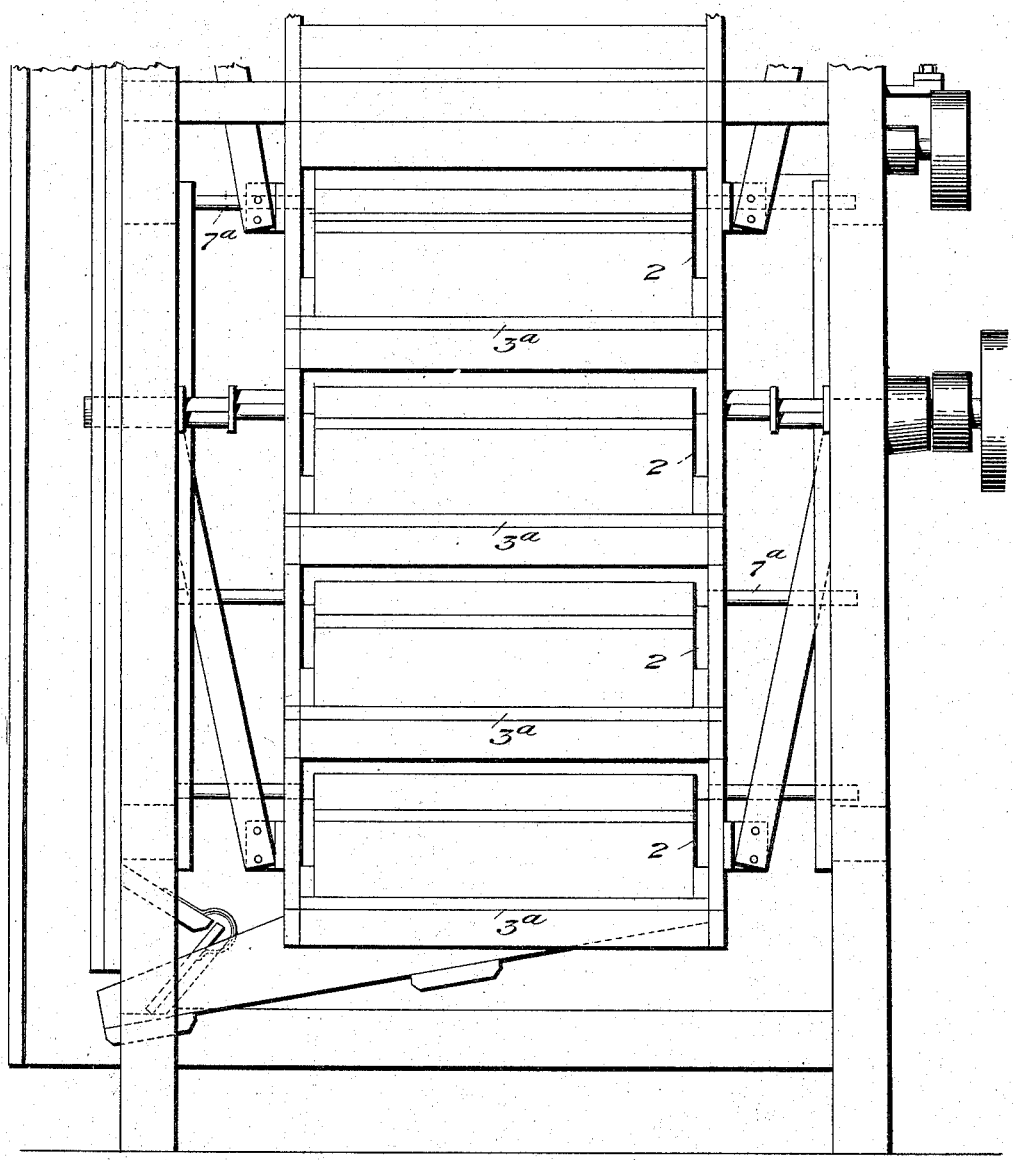

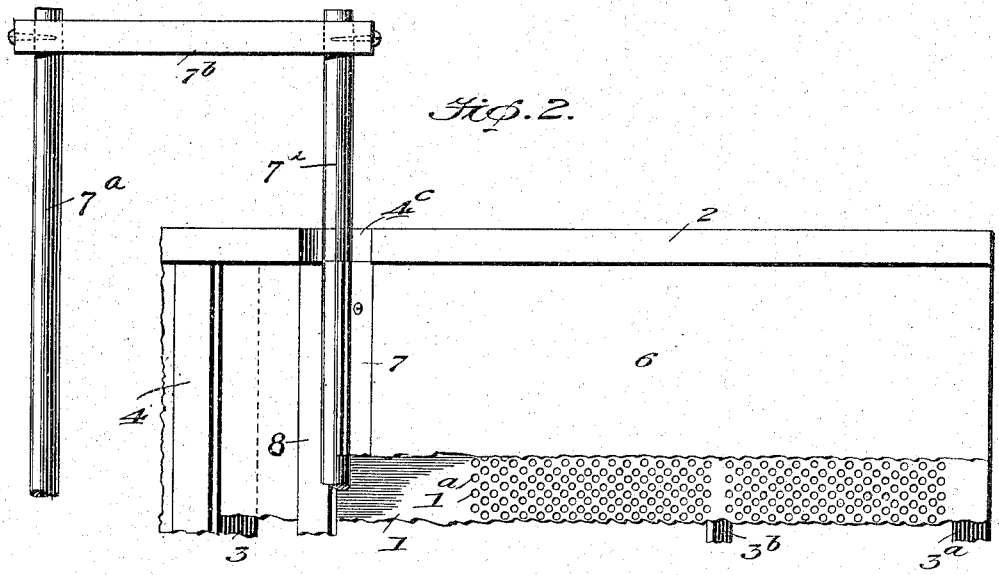
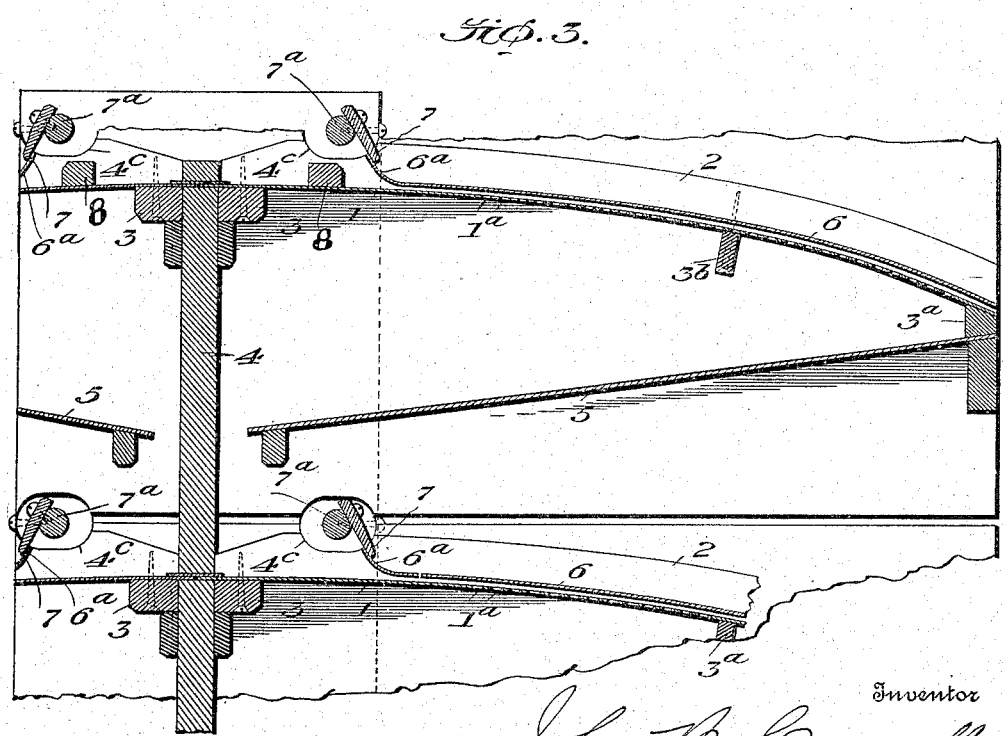

JOHN B. CORNWALL, OF MOLINE, ILLINOIS, ASSIGNOR TO BARNARD AND LEAS MANUFACTURING COMPANY, OF MOLINE, ILLINOIS, A CORPORATION OF ILLINOIS.

GRAIN-SEPARATOR.

1,226,189.   Specification of Letters Patent.   Patented May 15, 1917.

Application filed November 24, 1916. Serial No. 133,208.

*To all whom it may concern:*

Be it known that I, JOHN B. CORNWALL, a citizen of the United States, residing at Moline, in the county of Rock Island and State of Illinois, have invented certain new and useful Improvements in Grain-Separators; and I hereby declare that the following is a full, clear, and exact description thereof, reference being had to the accompanying drawings, which form part of this specification.

This invention relates to grain separating machines, and the particular object of the invention is to provide a machine capable of separating wild black oats from wheat, which it has heretofore been found very difficult to accomplish. The invention provides novel means whereby such object may be successfully accomplished, and the invention is also adapted for use in separating other grains or materials.

I have discovered that if wild oats can be kept substantially parallel with the surface of the screen over which they are passed that they can be sieved out of the wheat; if fed upon an open screen the oats when shaken will assume various positions and if they assume a position substantially perpendicular to the screen they will pass through the perforations therein like the wheat; I therefore cover the screen with an apron so disposed as to prevent the ends of the grain from rising or assuming a perpendicular position relative to the screen surface, and by having such apron stationary relatively to the screen that the successful separation of such oats was attained. I found that if the apron was attached to or moved with the screen it was practically impossible to make the apron lie still or maintain its proper position relatively to the screen, and the apron would have undulatory movements which would cause portions of the apron at times to rise or separate so far from the surface of the related screen as to permit the oats to assume a position substantially perpendicular to the screen and pass through the openings therein. By making the apron stationary, relative to the screen, this objection was overcome and the wild oats were kept in position parallel with the surface of the screen, and therefore would not pass through the screen with the wheat.

The screens are usually made of sheet metal and when arranged flat, or plane surfaced, agitation would sometimes cause the screen to wrinkle and produce variations in space between the surface of the screen and the related apron and sometimes the spaces were wide enough to allow the wild oats to assume a position perpendicular to the screen and pass through the openings therein. Furthermore it is almost impossible to make or to keep sheet metal screens straight or flat, or lie in a uniform plane, as the screen is apt to undulate or bend more or less under stretching or distortion of the metal due to the perforating thereof. I found that if such sheet screens are curved, after being perforated, they will maintain a substantially uniform surface.

Preferably I curve the screens outward and downward away from the point at which the grain is admitted thereonto. Such curving of the screen facilitates the separating operation, on account of the gradually increasing inclination toward the discharge end, and after the best grain passes through the upper part of the screen the rougher grain with the dirt and oats, passes over that portion of the screen which is most curved; and it is very desirable that the refuse and undesirable portions should be passed more rapidly over the screen toward the discharge end thereof, and this is accomplished by increasing the curvature of the screen from the receiving end toward the discharge end thereof.

I further found that curving of the screen also enhanced the utility and efficiency of the apron as the apron will maintain a more uniform position relative thereto. When a flat apron is used with a flat screen, the apron also has a tendency to wrinkle or curve and form spaces wherein oats, or undesirable refuse, might assume positions perpendicular to the screen and so pass through the screen openings. But by curving both the screen and the apron, in addition to the advantages above stated regarding the screen, the apron would lie uniformly over the screen without wrinkling and conform to the shape of the screen.

In the preferred embodiment of the invention the apron does not vibrate with the screen, and acts as a rubbing device to prevent any foreign particles becoming lodged in the screen, and also assists in clearing the rougher grains of adhering particles.

In the accompanying drawings I have illustrated part of a grain sieve or separator showing one embodiment of the invention and refer thereto as part of this specification.

In said drawings:

Figure 1 is an end elevation of part of a grain separator showing a shaking shoe provided with one arrangement of screens and aprons embodying the invention.

Fig. 2 is an enlarged plan view of part of a screen and apron constructed and arranged in accordance with this invention.

Fig. 3 is a sectional view of part of a shoe having my novel arrangement of screens and aprons.

The screens 1 are preferably made of sheet metal, provided with suitable perforations, indicated at $1^a$, for the passage of grain but which will prevent the passage of impurities like wild oats unless the latter can assume a position substantially perpendicular to the screen. This screen may be supported in any suitable manner, and, as shown, may be attached at its sides to curved bars as 2 mounted in a shaking shoe of any suitable construction, such as is ordinarily employed in grain separators. The ends of the screen are shown as attached to bars 3, $3^a$; such bars being mounted in or upon the shoe as usual. In the construction shown the shoe is divided centrally by a vertical partition 4; and sets of screens and aprons are arranged at opposite sides of this partition as is usual and as indicated in Fig. 3. I do not however claim herein any particular construction of shoe, or any particular means for reciprocating it.

It will be observed by reference to Fig. 3 that each screen is bowed or curved outwardly and downwardly from its inner end attached to bar 3, to its outer end, attached to bar $3^a$. If desired the screens may be stiffened by intermediate bars $3^b$ as indicated in the drawings.

Above each screen is a related apron 6, preferably made of flexible sheet material and imperforate. These aprons may be of cloth or light leather that has a smooth surface on one side. Preferably I use so called "oil cloth" that is a rather heavy fabric glazed or coated on one side. I can, however, use smooth surfaced leather or any other smooth leather product or fabric that is not too heavy and is smooth on the side next to the grain. Each apron may, as shown, have its inner end $6^a$ bent upwardly and attached to a bar 7, attached to a rod $7^a$ that extends through the shoe. Said rods project through openings $4^c$ in the side walls of the shoe and are attached in any suitable manner to a support independent of the shoe so as to hold the aprons stationary relatively to the screens. As shown the rods $7^a$ may be fastened to supports $7^b$ attached to the main frame of the machine at opposite sides of the shoe.

It will be seen that with this construction the aprons are supported at their inner or receiving sides or edges independently of and above the screens, and the latter can be reciprocated, by shaking the shoe in the usual manner, and the screens move back and forth longitudinally under the aprons. In the example shown the aprons are not supported except by the bars 7 and rods $7^a$.

The receiving end of the screen is that adjacent the bar 3, and the discharging end is that adjacent the bar $3^a$. The material falling through an upper screen can be directed inward by means of a chute 5 arranged below the screen in the usual manner.

From the foregoing it will be seen that the perfected form of construction provides a separator having a curved screen covered by a similar curved apron that is not vibrated with the screen.

In the construction shown, the two uppermost screens are provided near their inner ends with strips 8, and the grain may be fed onto the uppermost screens between strips 8, 8 in the usual manner by any suitable means. The space between strips 8, 8 forms a tray or distributer which divides the grain evenly between the two sections of the shoe. These two sections being separate and distinct, are simply a duplication of each other, separated by the partition between them. The grain after being divided by the tray at the top of the nest of sieves, is kept divided by the partition and each side of the shoe handles its own portion of the grain, thus doubling the capacity. The tray formed by the strips on the top sieve is filled with grain which then shakes evenly over each strip and going to each side of the shoe.

The shoe is reciprocated so as to vibrate the screens longitudinally under the aprons 6, and the material passes from the inner end of the screen outwardly between the apron and the screen; and while the wheat or good grain passes through the perforations in the screens the black oats and like impurities are kept from standing on end or tilting at such an angle to the surface of the screens as would enable them to pass through the openings $1^a$, with the result that such oats and impurities are separated from the grain.

It will be seen that each screen is curved and has a related curved apron extending over the perforated surface of the screen, and such apron is supported independently of the screen so that when the shoe is vibrated the screen moves under the apron and the grain is separated in the manner hereinbefore set forth.

By curving the screens and aprons and having the aprons mounted independently of the screens and not moving therewith, I have produced an efficient reliable separator in which the grain is effectively separated, the sieve kept clean and grain more thoroughly cleaned and separated, and grain fed upon the screen is prevented from sliding or running over the surface of the screen without being screened, and the capacity of the screen, for a given amount of surface, is enhanced.

What I claim is:

1. In a separator for the purpose specified a curved screen adapted to be vibrated and a similarly curved apron overlying the perforated portion of the screen and supported at its inner or receiving side independently of the screen.

2. In a grain separator a curved screen adapted to be vibrated; and a co-acting similarly curved and relatively stationary apron overlying the perforated portion of the screen and supported at its inner or receiving side independently of the screen.

3. In a separator the combination of a curved screen adapted to be reciprocated, an apron extending over the perforated surface of the screen and curved correspondingly to the screen; and a bar fixed to a stationary portion of the separator independent of the vibrating screen and adapted to support the apron at its inner or receiving side.

In testimony that I claim the foregoing as my own, I affix my signature.

JOHN B. CORNWALL.

Copies of this patent may be obtained for five cents each, by addressing the "Commissioner of Patents, Washington, D. C."